United States Patent
Jang

(10) Patent No.: US 8,045,061 B2
(45) Date of Patent: Oct. 25, 2011

(54) METHOD AND APPARATUS FOR REMOVING COLOR NOISE OF IMAGE SIGNAL

(75) Inventor: Soon-geun Jang, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 12/290,409

(22) Filed: Oct. 30, 2008

(65) Prior Publication Data

US 2009/0161019 A1    Jun. 25, 2009

(30) Foreign Application Priority Data

Dec. 21, 2007 (KR) .................... 10-2007-0135735

(51) Int. Cl.
*H04N 5/21* (2006.01)
*H04N 9/77* (2006.01)

(52) U.S. Cl. ........................ 348/624; 348/663
(58) Field of Classification Search .................. 348/607, 348/624, 663, 666, 252, 253, 630, 712, 713; 382/275, 254; 345/611; *H04N 5/21, 9/77, H04N 9/78, 9/64*
See application file for complete search history.

(56) References Cited

U.S. PATENT DOCUMENTS

| 6,018,596 A | 1/2000 | Wilkinson ................... 382/275 |
| 6,377,313 B1 | 4/2002 | Yang et al. .................... 348/663 |
| 2004/0028271 A1 | 2/2004 | Pollard et al. |
| 2006/0038891 A1 | 2/2006 | Okutomi et al. |

FOREIGN PATENT DOCUMENTS

| EP | 0 605 212 A1 | 7/1994 |
| GB | 2 083 318 A | 3/1982 |
| KR | 10-2006-0133773 A | 12/2006 |
| KR | 10-2007-0004387 A | 1/2007 |

*Primary Examiner* — Sherrie Hsia
(74) *Attorney, Agent, or Firm* — Drinker Biddle & Reath LLP

(57) ABSTRACT

A method and apparatus remove color noise of an image signal in which a distortion of a YCbCr color space caused by noise is corrected using correlations between color channels in the YCbCr color space of low frequency (LF) and high frequency (HF) components of an image signal while maintaining the HF component. The apparatus includes: a separator separating the image signal including a luminance signal and a chrominance signal into an LF component and an HF component; an LF noise remover removing noise of the LF component from the image signal; an HF noise remover applying a linear variation rate of the chrominance signal with regard to the luminance signal of the noiseless LF component to the HF component separated from the image signal and generating a new HF component; and a combiner combining the noiseless LF component and the new HF component.

13 Claims, 5 Drawing Sheets

METHOD AND APPARATUS FOR REMOVING COLOR NOISE OF IMAGE SIGNAL

CROSS-REFERENCE TO RELATED PATENT APPLICATION

This application claims the priority of Korean Patent Application No. 10-2007-0135735, filed on Dec. 21, 2007 in the Korean Intellectual Property Office, the disclosure of which is incorporated herein in its entirety by reference.

BACKGROUND

The present invention relates to a method and apparatus for processing an image signal, and more particularly, to a method and apparatus for removing color noise of an image signal in which a distortion of YCbCr color space caused by noise is corrected using correlations between color channels in the YCbCr color space of low and high frequency components of an image signal while maintaining the high frequency component of the image signal.

A conversion of RGB signals, which are continuous signals having different wavelengths, into digital signals causes aliasing in each channel due to sampling if not performed at an optimal sampling frequency. This also causes color noise due to a distortion of correlations between RGB image values.

Conventionally, a smooth variation of R-G and B-G values is used to remove noise. However, the smooth variation of R-G and B-G values is not necessarily maintained in high frequency components of image signals with regard to color noise that occurs due to sampling of image signals at an inappropriate sampling frequency. Furthermore, since an intermediate value of R-G and B-G values is used as a reference value without color noise, edge components that are important in image quality vary when the smooth variation of R-G and B-G values is used to remove color noise, thus resulting in a failure to obtain desired images.

SUMMARY

The present invention provides a method and apparatus for removing color noise from an image signal in which a distortion of a YCbCr color space caused by noise is corrected by correlations between color channels in the YCbCr color space of a low frequency component of an image signal being maintained at the same rate in a high frequency component of the image signal while maintaining the high frequency component of the image signal when the low frequency component is accurately obtained from the image signal.

According to an aspect of the present invention, there is provided an apparatus for removing color noise of an image signal, the apparatus comprising: a separation unit separating the image signal including a luminance signal and a chrominance signal into a low frequency component and a high frequency component; a low frequency noise removing unit removing noise of the low frequency component from the image signal; a high frequency noise removing unit applying a linear variation rate of the chrominance signal with regard to the luminance signal of the low frequency component without noise to the high frequency component separated from the image signal and generating a new high frequency component; and a combination unit combining the low frequency component without noise and the new high frequency component.

The low frequency noise removing unit may compare a number of pixels of a substantial low frequency component with a number of noise pixels in a predetermined division area, calculate an average value of pixels of the substantial low frequency component, and establish the average pixel value as a low frequency component of the predetermined division area.

The low frequency noise removing unit may comprise: an area dividing unit dividing the low frequency component into predetermined areas; a comparing unit comparing the number of pixels of a substantial low frequency component with the number of noise pixels in the divided areas; an average calculation unit calculating an average value of pixels of the substantial low frequency component if the number of pixels of the substantial low frequency component is greater than the number of noise pixels; and a controller establishing the average value as a low frequency component of the divided areas.

The controller may extend the divided areas divided by the area dividing unit if the number of pixels of the substantial low frequency component is smaller than the number of noise pixels.

The controller may reduce a size of an original image if the number of pixels of the substantial low frequency component is smaller than the number of noise pixels.

The apparatus may further comprise: a variation rate calculation unit calculating the linear variation rate of the chrominance signal with regard to the luminance signal of the low frequency component without noise.

The high frequency noise removing unit may change the chrominance signal with the luminance signal of the high frequency component separated from the image signal according to the linear variation rate of the chrominance signal.

According to another aspect of the present invention, there is provided a method of removing color noise of an image signal, the method comprising: separating the image signal including a luminance signal and a chrominance signal into a low frequency component and a high frequency component; removing noise of the low frequency component from the image signal; applying a linear variation rate of the chrominance signal with regard to the luminance signal of the low frequency component without noise to the high frequency component separated from the image signal and generating a new high frequency component; and combining the low frequency component without noise and the new high frequency component.

The removing noise of the low frequency component from the image signal may comprise: dividing the low frequency component into predetermined areas; comparing a number of pixels of a substantial low frequency component with a number of noise pixels in the divided areas; calculating an average value of pixels of the substantial low frequency component if the number of pixels of the substantial low frequency component is greater than the number of noise pixels; and establishing the average value as a low frequency component of the divided areas.

If the comparing determines that the number of pixels of the substantial low frequency component is smaller than the number of noise pixels, the divided areas may be extended.

If the comparing determines that the number of pixels of the substantial low frequency component is smaller than the number of noise pixels, a size of an original image may be reduced.

The method may further comprise: calculating the linear variation rate of the chrominance signal with regard to the luminance signal of the low frequency component without noise.

The applying of the linear variation rate of the chrominance signal may comprise: changing the chrominance signal with the luminance signal of the high frequency component separated from the image signal according to the linear variation rate of the chrominance signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

The present invention will now be described more fully with reference to the accompanying drawings, in which exemplary embodiments of the invention are shown and described below.

Figure 1:
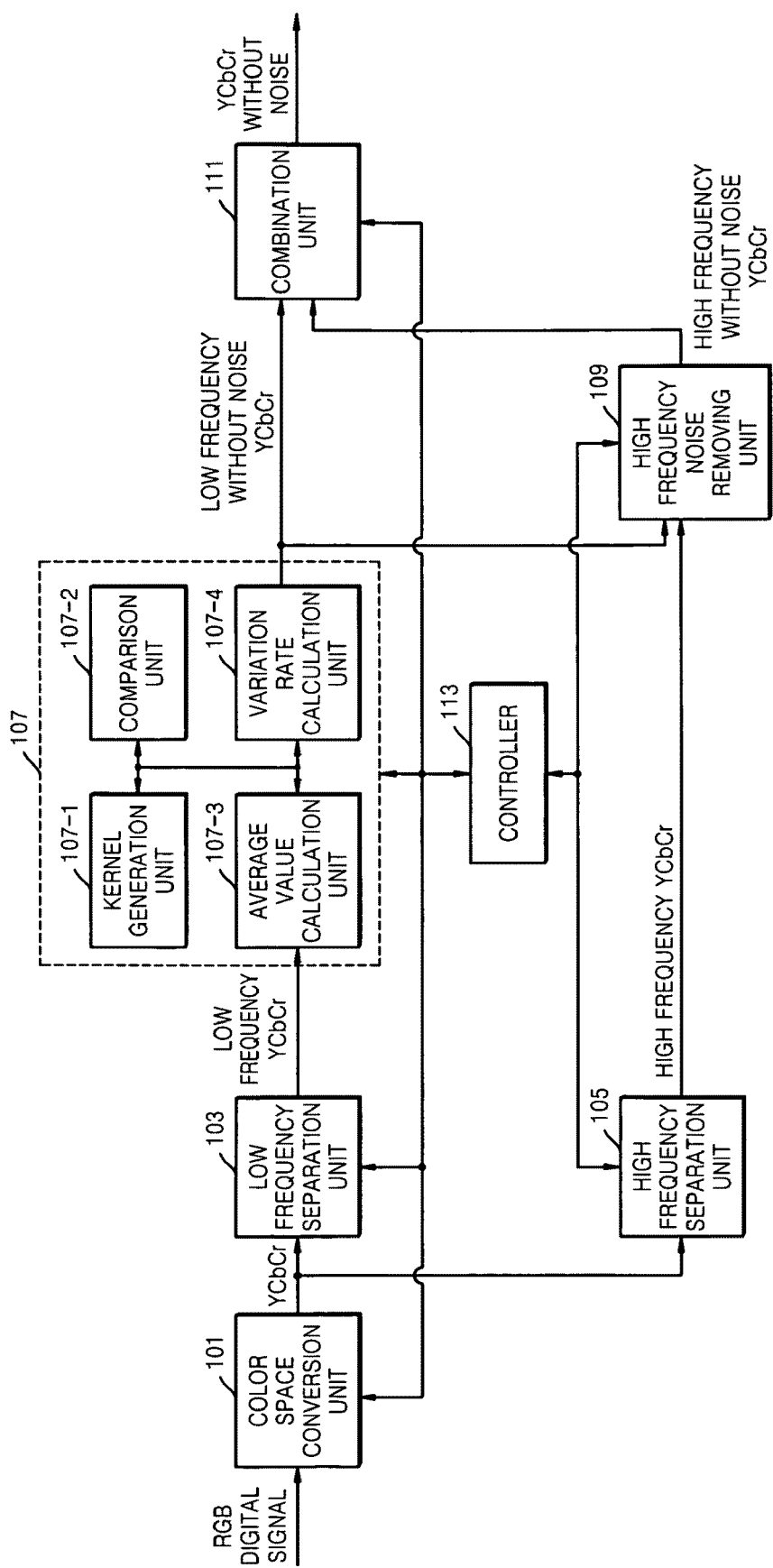
FIG. 1 is a block diagram of an apparatus for removing color noise of an image signal according to an embodiment of the present invention.

FIG. 1 is a block diagram of an apparatus for removing color noise of an image signal according to an embodiment of the present invention. Referring to FIG. 1, the apparatus for removing color noise of the image signal comprises a color space conversion unit 101, a low frequency separation unit 103, a high frequency separation unit 105, a low frequency noise removing unit 107, a high frequency noise removing unit 109, a combination unit 111, and a controller 113.

The color space conversion unit 101 converts a linear type RGB color image signal including noise into an YCbCr color image signal. The linear type RGB signal is converted into the YCbCr color image signal according to the ITU.BT-709 standard by a matrix operation as given by equation 1 below. The YCbCr color image signal is separated into a luminance component Y and a chrominance component CbCr.

$$\begin{bmatrix} Y \\ Cb \\ Cr \end{bmatrix} = \begin{bmatrix} 0.2215 & 0.7154 & 0.0721 \\ -0.1145 & -0.3855 & 0.5 \\ 0.5016 & -0.4556 & -0.0459 \end{bmatrix} \begin{bmatrix} R \\ G \\ B \end{bmatrix} \quad (1)$$

The YCbCr color image signal that is output by the color space conversion unit 101 is input into the low frequency separation unit 103 and the high frequency separation unit 105, and is separated into a low frequency YCbCr color image signal and a high frequency YCbCr color image signal.

Figure 2:
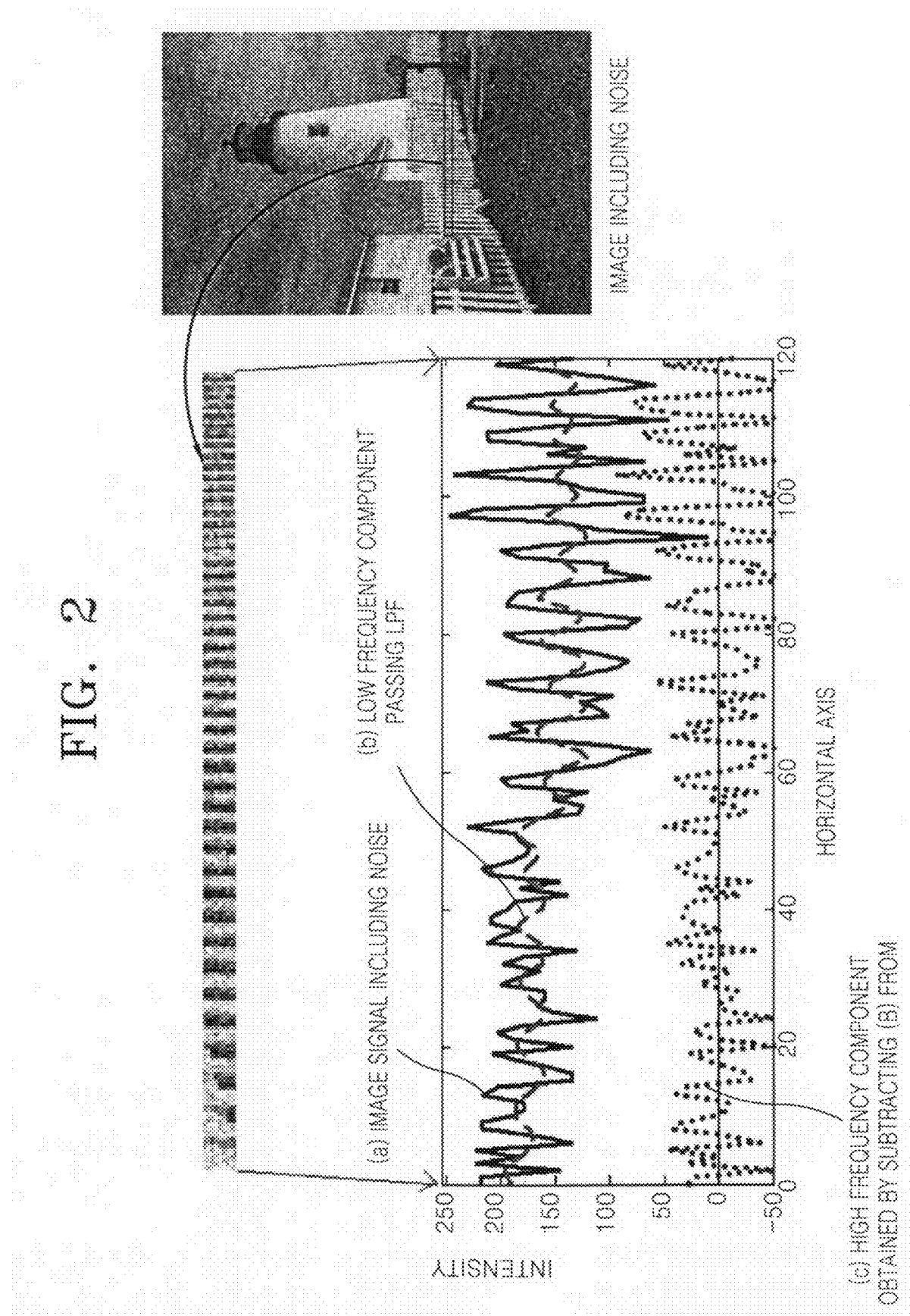
FIG. 2 is a chart with corresponding image for explaining a separation of low and high frequency components from an image signal in the apparatus of FIG. 1 according to an embodiment of the present invention.

The low frequency separation unit 103 is realized as a low pass filter (LPF), low-pass-filters the YCbCr color image signal including noise, and separates a low frequency (direct current) component from the YCbCr color image signal including noise as shown in FIG. 2 (a). FIG. 2 (b) illustrates the low frequency component that the LPF passes and that is separated from the YCbCr color image signal including noise.

The high frequency separation unit 105 subtracts the low frequency component shown in FIG. 2 (b) from the YCbCr color image signal including noise shown in FIG. 2 (a) in order to separate a high frequency component from the YCbCr color image signal including noise. FIG. 2 (c) illustrates the high frequency component obtained by subtracting the low frequency component from the YCbCr color image signal including noise.

The low frequency noise removing unit 107 removes noise of the YCbCr low frequency component that is output by the low frequency separation unit 103 from the YCbCr color image signal including noise. The low frequency noise removing unit 107 removes noise of a low frequency luminance component (Y), a low frequency chrominance component (Cb), and a low frequency chrominance component (Cr) from the YCbCr color image signal including noise. In the present embodiment, the low frequency noise removing unit 107 comprises a kernel generation unit 107-1, a comparison unit 107-2, an average value calculation unit 107-3, and a variation rate calculation unit 107-4, and its overall operation is controlled by the controller 113.

Figure 3:
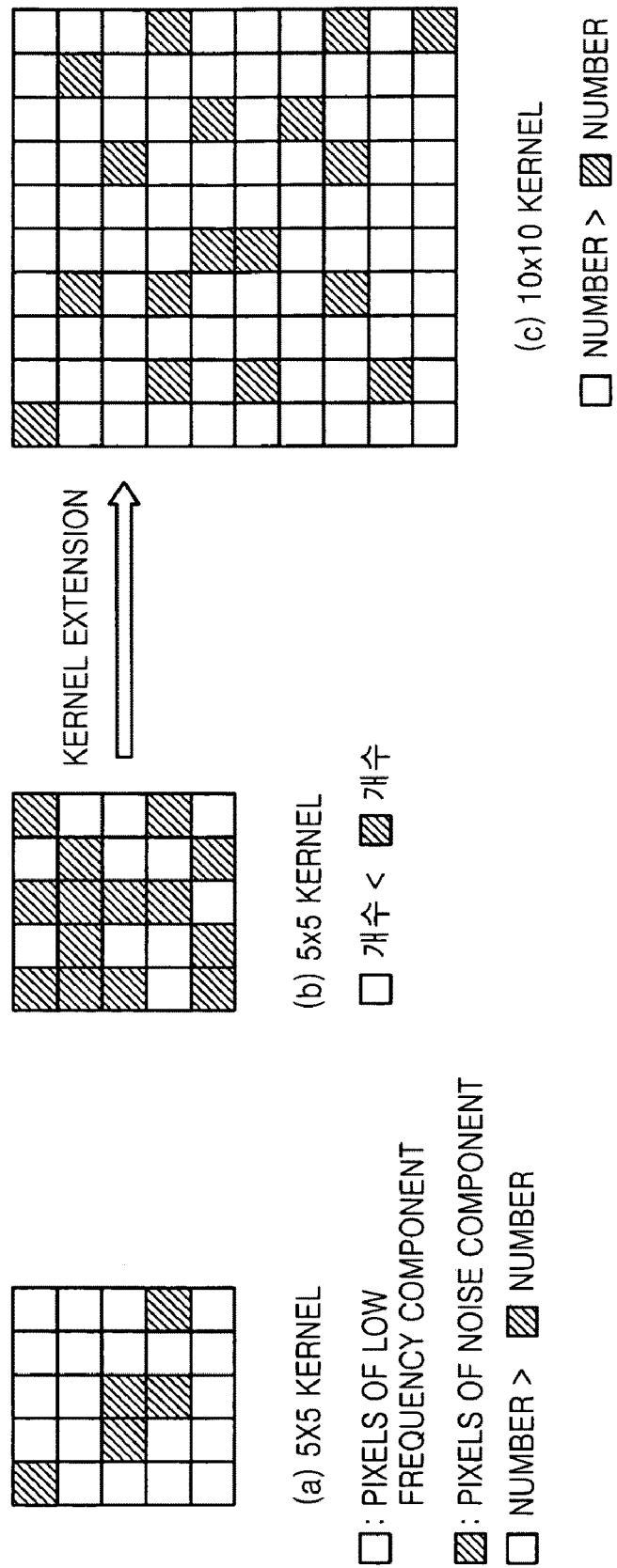
FIG. 3 is a pictorial representation illustrating kernels used to remove noise of a low frequency component in the apparatus of FIG. 1 according to an embodiment of the present invention.

The kernel generation unit 107-1, which is an area division unit, divides an image of the low frequency component into predetermined areas, e.g., a 5×5 area. FIG. 3 (a) illustrates a 5×5 kernel generated by the kernel generation unit 107-1 under the control of the controller 113. Referring to FIG. 3 (a), the 5×5 kernel includes a pixel (un-shaded) of the substantial low frequency component and a pixel (shaded) of a noise component.

The comparison unit 107-2 compares the number of pixels of the substantial low frequency component with the number of pixels of the noise component included in the 5×5 kernel. Although not shown, a counter included in the controller 113 counts the number of pixels of the substantial low frequency component and the number of pixels of the noise component. The comparison unit 107-2 receives the counting result and determines whether the number of pixels of the substantial low frequency component is greater or smaller than the number of pixels of the noise component based on the counting result.

If the number of pixels of the substantial low frequency component is greater than the number of pixels of the noise component, the average value calculation unit 107-3 calculates an average value of pixel values of the substantial low frequency component in a corresponding pixel by calculating the sum of all pixel values of the substantial low frequency component and dividing the pixel value sum by a total number of pixels.

The controller 113 establishes the average value output by the average value calculation unit 107-3 as a low frequency component value of the corresponding kernel. Thus, the pixels of the noise component are overwritten as the average value of pixel values of the substantial low frequency component, thereby removing noise of the low frequency component.

Meanwhile, if the number of pixels of the substantial low frequency component is smaller than the number of pixels of the noise component, the controller 113 controls the kernel generation unit 107-1 to extend the corresponding kernel and compare the number of pixels of the substantial low frequency component with the number of pixels of the noise component in the extend kernel.

Referring to FIG. 3 (b), the number of pixels of the substantial low frequency component is determined to be smaller than the number of pixels of the noise component as a result of counting the number of pixels in the 5×5 kernel. In this case, the controller 113 outputs a kernel extension (e.g., 10×10) control signal to the kernel generation unit 107-1. Then the kernel generation unit 107-1 generates a 10×10 kernel shown in FIG. 3 (c). The subsequent operation is the same as described above and thus its description will not be repeated.

Alternatively, if the number of pixels of the substantial low frequency component is determined to be smaller than the number of pixels of the noise component, the controller 113 reduces the size of an original image by ¼, which results in noise reduction. Thereafter, the control 113 controls the reduced image to generate a kernel, compare the number of pixels, and calculate an average value of pixels. The detailed description thereof is the same as described above and thus will not be repeated.

Generally, an increase of the luminance component (Y) in the YCbCr color image signal reduces the chrominance component (CbCr), making an image appear gray overall. To the contrary, a reduction of the luminance component (Y) in the YCbCr color image signal increases the chrominance component (CbCr), making an image excessively chromatic. Thus, since only a readjustment of the luminance component (Y) produces an unnatural result, the luminance component (Y) must be corrected so that the chrominance component (CbCr) can be linearly changed accordingly.

Since noise is removed from the low frequency component that is output by the average value calculation unit 107-3, it is noted in the low frequency component without noise that the chrominance component (CbCr) is linearly changed according to the correction of the luminance component (Y). The variation rate calculation unit 107-4 calculates a linear variation rate of the chrominance component CbCr with regard to the luminance component (Y) of the low frequency component.

When an image is captured by a charge coupled device (CCD) (not shown) via a lens (not shown), in order to remove sensitivity characteristics of a CCD array and a dark current of the CCD, the image is corrected by adjusting white balance, removing optical black, and using a gamma curve.

When white balance of the image is adjusted, a white balance correction coefficient is multiplied by an RGB value in order to make a real white area in the scene/subject being photographed white in the image. When RGB data whose white balance is adjusted is converted into a YCbCr color space, it is assumed that color channels are linearly related to each other.

In the present embodiment, a calculation of Cb and Cr values with regard to a Y value in the YCbCr color space enables the linear relationship between the Cb and Cr values to be described. Furthermore, when the high frequency component (obtained by subtracting the low frequency component from the original image) is separated from the original image, the linear relationship between the Cb and Cr values with regard to the Y value is maintained in the same manner in the low and high frequency components, thereby removing color noise.

The high frequency noise removing unit 109 applies the linear variation rate of the low frequency component that is output by the variation rate calculation unit 107-4 to the high frequency component that is separated by the high frequency separation unit 105 and generates a new high frequency component.

The linear variation rate of the chrominance component (CbCr) with regard to the luminance component (Y) of the low frequency component and the linear variation rate of the chrominance component (CbCr) with regard to the luminance component (Y) of the high frequency component is given according to equation 2 below.

$$Y^{low}:Cb^{low}:Cr^{low} = Y^{high}:Cb^{high}:Cr^{high} \qquad (2)$$

The high frequency noise removing unit 109 applies the linear variation rate of the chrominance component (CbCr) with regard to the luminance component (Y) of the low frequency component to the high frequency component that is separated by the high frequency separation unit 105, changes the chrominance component (CbCr) based on the luminance component (Y) of the separated high frequency component, and generates a high frequency component without noise.

Figure 4:
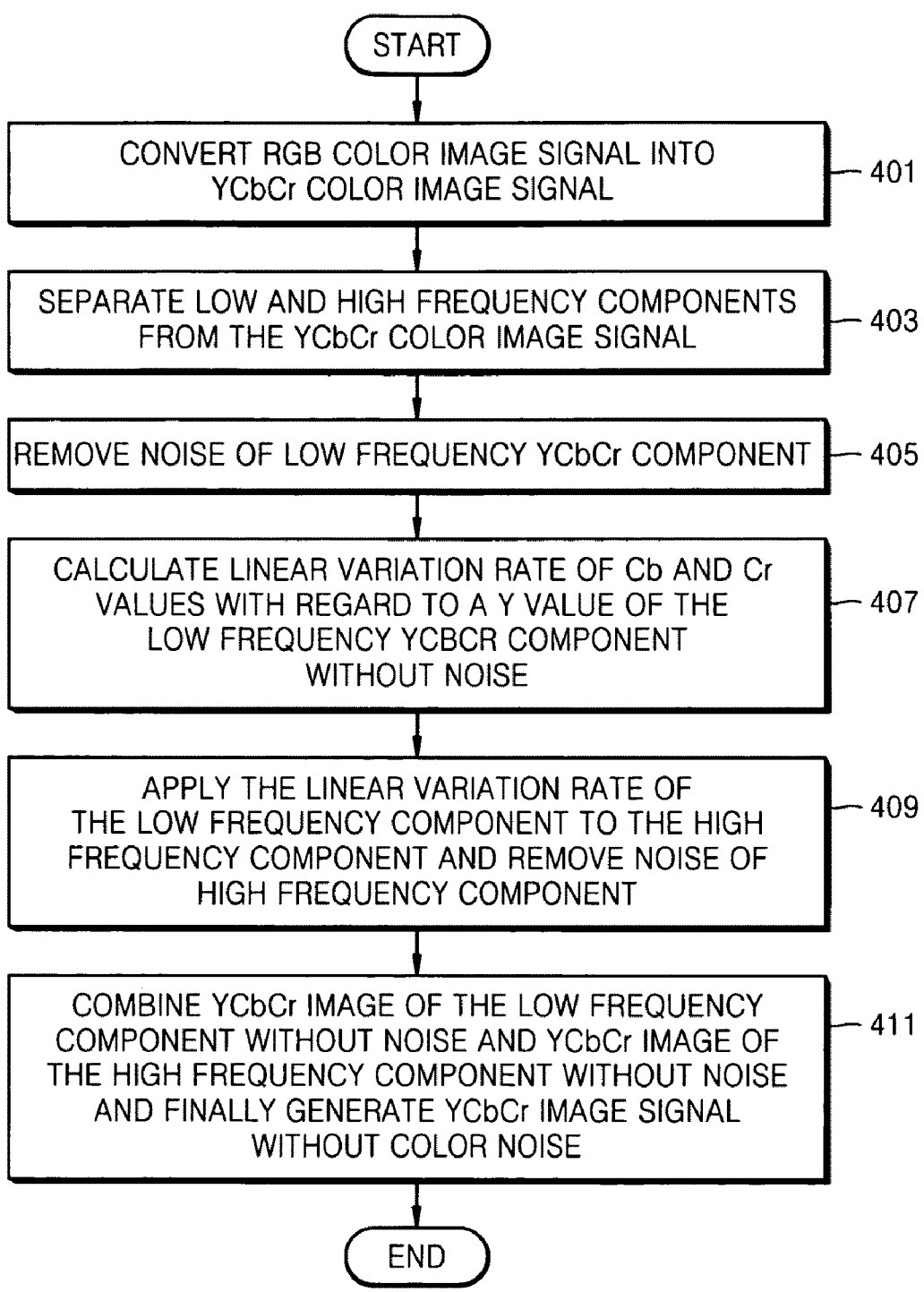
FIG. 4 is a flowchart illustrating a method of removing color noise of an image signal according to an embodiment of the present invention.

The combination unit 111 combines a YCbCr image of the low frequency component without noise and a YCbCr image of the high frequency component without noise and finally generates a YCbCr image signal without color noise (operation 411 of FIG. 4).

The correlations between color channels in a YCbCr color space of low and high frequency components of an image signal are used to correct a distortion of the YCbCr color space caused by noise while maintaining the high frequency component of the image signal, thereby obtaining an image without color noise.

Figure 5:
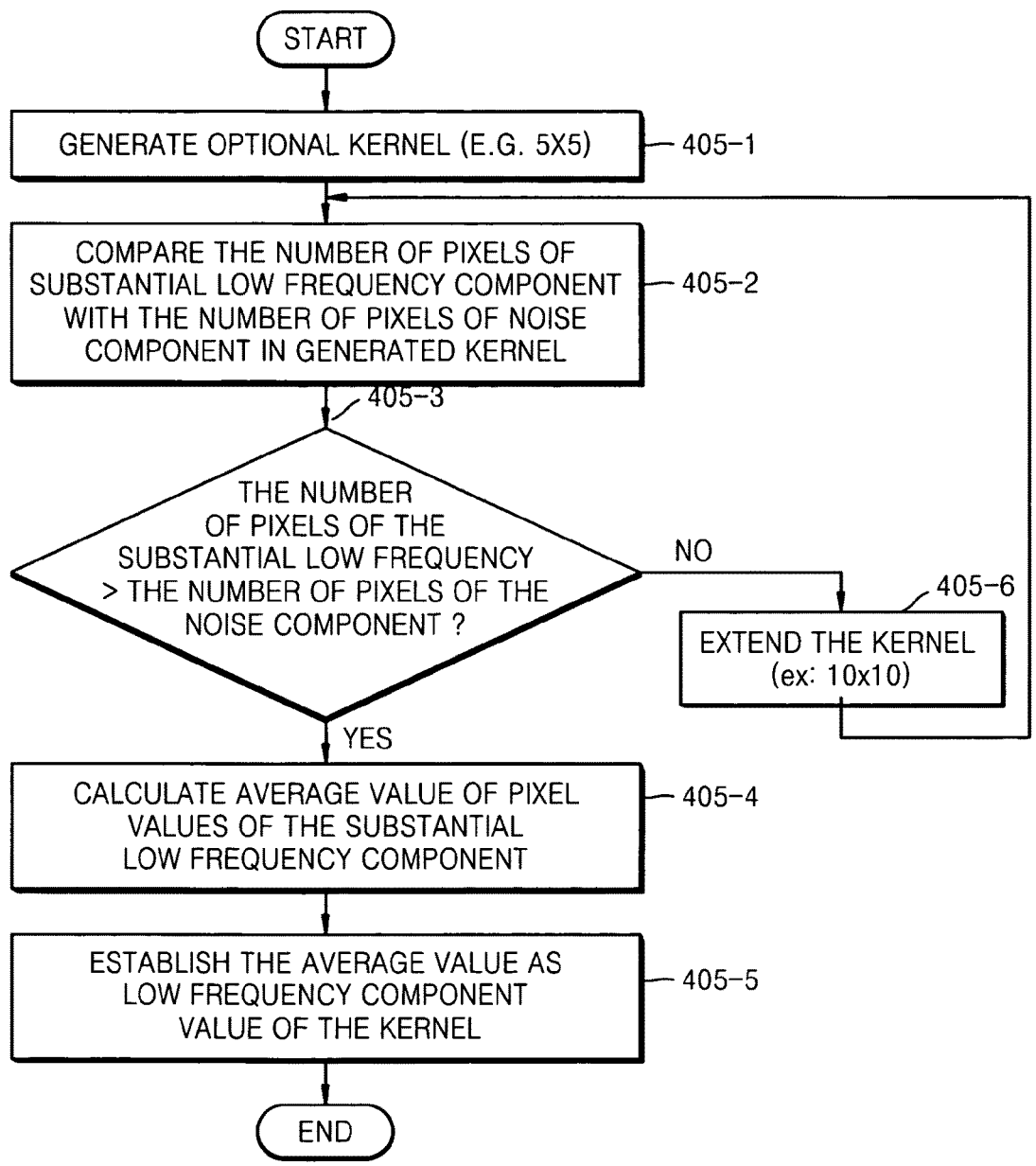
FIG. 5 is a flowchart illustrating a method of removing noise of a low frequency component among the method shown in FIG. 4 according to an embodiment of the present invention.

A method of removing color noise of an image signal according to an embodiment of the present invention will now be described with reference to FIGS. 4 and 5. The method of removing color noise of the image signal according to the present embodiment may be performed by the apparatus for removing color noise of the image signal, shown in FIG. 1. According to embodiments of the present invention, a main algorithmic process may be carried out under the control of the controller 113 through peripheral elements of the apparatus.

The controller 113 controls the color space conversion unit 101 to convert an RGB color image signal including noise into a YCbCr color image signal (operation 401). The RGB signal is converted into the YCbCr color image signal according to the ITU.BT-709 standard by a matrix operation as in equation 1 presented above.

The controller 113 controls the low frequency separation unit 103 and the high frequency separation unit 105 to separate low and high frequency components from the YCbCr color image signal (operation 403). With regard to the low frequency component, the YCbCr color image signal including noise is low-pass-filtered as shown in FIG. 2 (a) and the low frequency (DC) component is separated from the YCbCr color image signal as shown in FIG. 2 (b). With regard to the high frequency component, the low frequency component shown in FIG. 2 (b) is subtracted from the YCbCr color image signal including noise shown in FIG. 2 (a) in order to separate the high frequency component as shown in FIG. 2 (c).

If the low and high frequency components are completely separated from the YCbCr color image signal, the controller 113 controls the low frequency noise removing unit 107 to remove noise of a low frequency YCbCr component (operation 405). FIG. 5 illustrates a method of removing the noise of the low frequency YCbCr component. Noise of each of a low frequency luminance component (Y), a low frequency chrominance component (Cb) and a low frequency chrominance component (Cr) is removed.

The controller 113 controls the low frequency noise removing unit 107 to generate an optional kernel with regard to an image of the low frequency component (operation 405-

1). Referring to FIG. 3 (a), the 5×5 kernel is generated by the kernel generation unit 107-1 of the low frequency noise removing unit 107. The 5×5 kernel includes a pixel (unshaded) of a substantial low frequency component and a pixel (shaded) of a noise component.

The controller 113 controls the low frequency noise removing unit 107 to compare the number of pixels of the substantial low frequency component with the number of pixels of the noise component in the generated kernel (operation 405-2).

The controller 113 determines whether the number of pixels of the substantial low frequency component is greater than the number of pixels of the noise component (operation 405-3).

If the number of pixels of the substantial low frequency component is greater than the number of pixels of the noise component, an average value of pixel values of the substantial low frequency component in a corresponding kernel is determined by calculating the sum of all pixel values of the substantial low frequency component and dividing the pixel value sum by a total number of pixels (operation 405-4).

The controller 113 establishes the average value as a low frequency component value of the kernel (operation 405-5). Pixels of the noise component are overwritten as the average value of pixel values of the substantial low frequency component, thereby removing noise of the low frequency component.

Meanwhile, if the number of pixels of the substantial low frequency component is smaller than the number of pixels of the noise component, the controller 113 outputs a kernel extension control signal to the low frequency noise removing unit 107 (operation 405-6). Referring to FIG. 3 (b), the number of pixels of the substantial low frequency component is determined to be smaller than the number of pixels of the noise component as a result of counting the number of pixels in the 5×5 kernel. In this case, the controller 113 outputs the kernel extension (e.g., 10×10) control signal to the low frequency noise removing unit 107. The low frequency noise removing unit 107 generates the 10×10 kernel shown in FIG. 3 (c). The controller 113 proceeds with operation 405-2 after generating the extended kernel.

Alternatively, if the number of pixels of the substantial low frequency component is smaller than the number of pixels of the noise component, the controller 113 reduces the size of an original image by ¼, which results in noise reduction. Thereafter, the controller 113 proceeds with operation 405-1.

After the noise of the low frequency component is removed, the controller 113 controls the low frequency noise removing unit 107 to calculate a linear variation rate of the chrominance component CbCr with regard to the luminance component of the low frequency YCbCr component without noise (operation 407).

The controller 113 controls the high frequency noise removing unit 109 to apply the linear variation rate of the low frequency component to the high frequency component that is separated by the high frequency separation unit 105 to generate a new high frequency component and remove noise of the high frequency component (operation 409). In more detail, the high frequency noise removing unit 109 applies the linear variation rate of the chrominance component (CbCr) with regard to the luminance component (Y) of the low frequency component to the high frequency component that is separated by the high frequency separation unit 105, changes the chrominance component (CbCr) with regard to the luminance component (Y) of the separated high frequency component, and generates a high frequency component without noise.

The controller 113 controls the combination unit 111 to combine a YCbCr image of the low frequency component without noise and a YCbCr image of the high frequency component without noise and finally generates a YCbCr image signal without color noise.

Accordingly, a distortion of a YCbCr color space caused by noise is corrected using correlations between color channels in the YCbCr color space of low and high frequency components of an image signal while maintaining the high frequency component of the image signal, thereby obtaining an image without color noise.

The system or systems may be implemented on any special or general purpose computer or computers or computer components of another device, such as a camera, and the components may be implemented as dedicated applications or in client-server architectures. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions executable on the processor on media such as tape, CD-ROM, etc., where this media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An apparatus for removing color noise of an image signal, the apparatus comprising:
   a separation unit that separates the image signal including a luminance signal and a chrominance signal into a low frequency component and a high frequency component;
   a low frequency noise removing unit that removes noise of the low frequency component from the image signal;
   a high frequency noise removing unit that applies a linear variation rate of the chrominance signal with regard to the luminance signal of the low frequency component without noise to the high frequency component separated from the image signal and generates a new high frequency component; and
   a combination unit that combines the low frequency component without noise and the new high frequency component.

2. The apparatus of claim 1, wherein the low frequency noise removing unit compares a number of pixels of a substantial low frequency component with a number of noise pixels in a predetermined division area, calculates an average value of pixels of the substantial low frequency component, and establishes the average pixel value as a low frequency component of the predetermined division area.

3. The apparatus of claim 2, wherein the low frequency noise removing unit comprises:
   an area dividing unit that divides the low frequency component into predetermined areas;
   a comparing unit that compares the number of pixels of a substantial low frequency component with the number of noise pixels in the divided areas;
   an average calculation unit that calculates an average value of pixels of the substantial low frequency component if the number of pixels of the substantial low frequency component is greater than the number of noise pixels; and
   a controller that establishes the average value as a low frequency component of the divided areas.

4. The apparatus of claim 3, wherein the controller extends the divided areas divided by the area dividing unit if the number of pixels of the substantial low frequency component is smaller than the number of noise pixels.

5. The apparatus of claim 4, wherein the controller reduces a size of an original image if the number of pixels of the substantial low frequency component is smaller than the number of noise pixels.

6. The apparatus of claim 5, further comprising:
   a variation rate calculation unit that calculates the linear variation rate of the chrominance signal with regard to the luminance signal of the low frequency component without noise.

7. The apparatus of claim 6, wherein the high frequency noise removing unit changes the chrominance signal with the luminance signal of the high frequency component separated from the image signal according to the linear variation rate of the chrominance signal.

8. A method of removing color noise of an image signal, the method comprising:
   separating the image signal including a luminance signal and a chrominance signal into a low frequency component and a high frequency component;
   removing noise of the low frequency component from the image signal;
   applying a linear variation rate of the chrominance signal with regard to the luminance signal of the low frequency component without noise to the high frequency component separated from the image signal and generating a new high frequency component; and
   combining the low frequency component without noise and the new high frequency component.

9. The method of claim 8, wherein the removing noise of the low frequency component from the image signal comprises:
   dividing the low frequency component into predetermined areas;
   comparing a number of pixels of a substantial low frequency component with a number of noise pixels in the divided areas;
   calculating an average value of pixels of the substantial low frequency component if the number of pixels of the substantial low frequency component is greater than the number of noise pixels; and
   establishing the average value as a low frequency component of the divided areas.

10. The method of claim 9, further comprising:
    extending the divided areas if the comparing determines that the number of pixels of the substantial low frequency component is smaller than the number of noise pixels.

11. The method of claim 9, further comprising:
    reducing a size of an original image if the comparing determines that the number of pixels of the substantial low frequency component is smaller than the number of noise pixels.

12. The method of claim 9, further comprising:
    calculating the linear variation rate of the chrominance signal with regard to the luminance signal of the low frequency component without noise.

13. The method of claim 12, wherein the applying of the linear variation rate of the chrominance signal comprises:
    changing the chrominance signal with the luminance signal of the high frequency component separated from the image signal according to the linear variation rate of the chrominance signal.

* * * * *